Patented Feb. 28, 1950

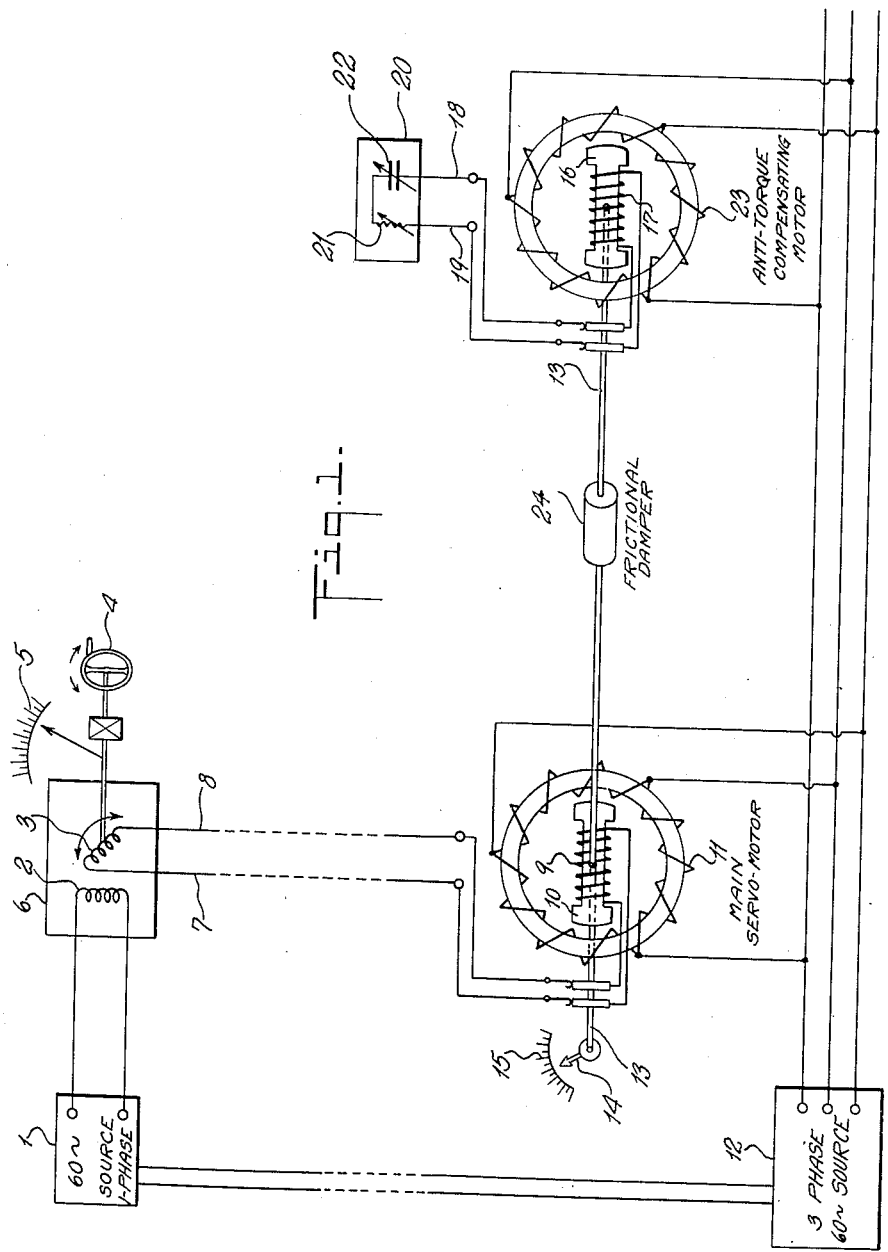

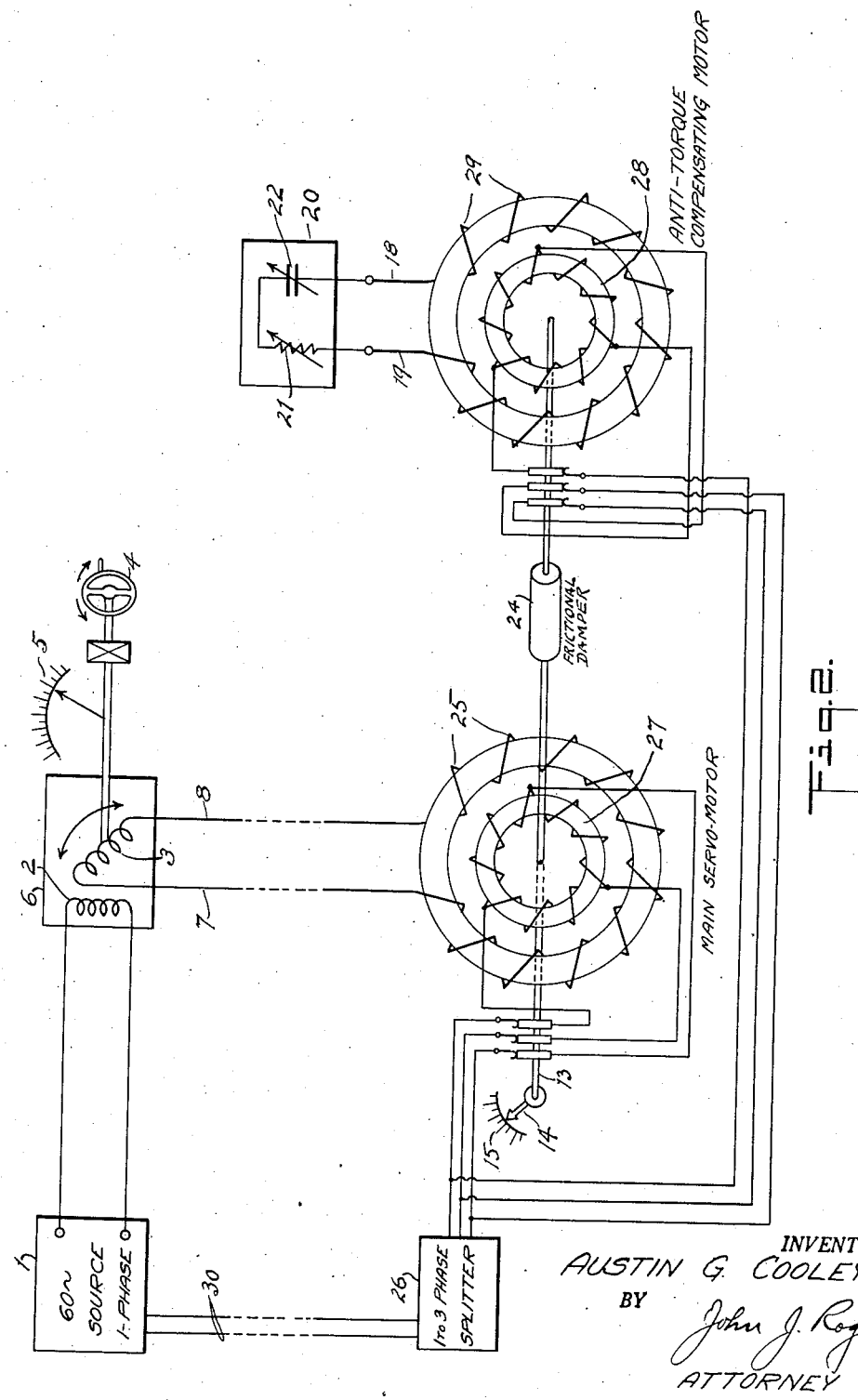

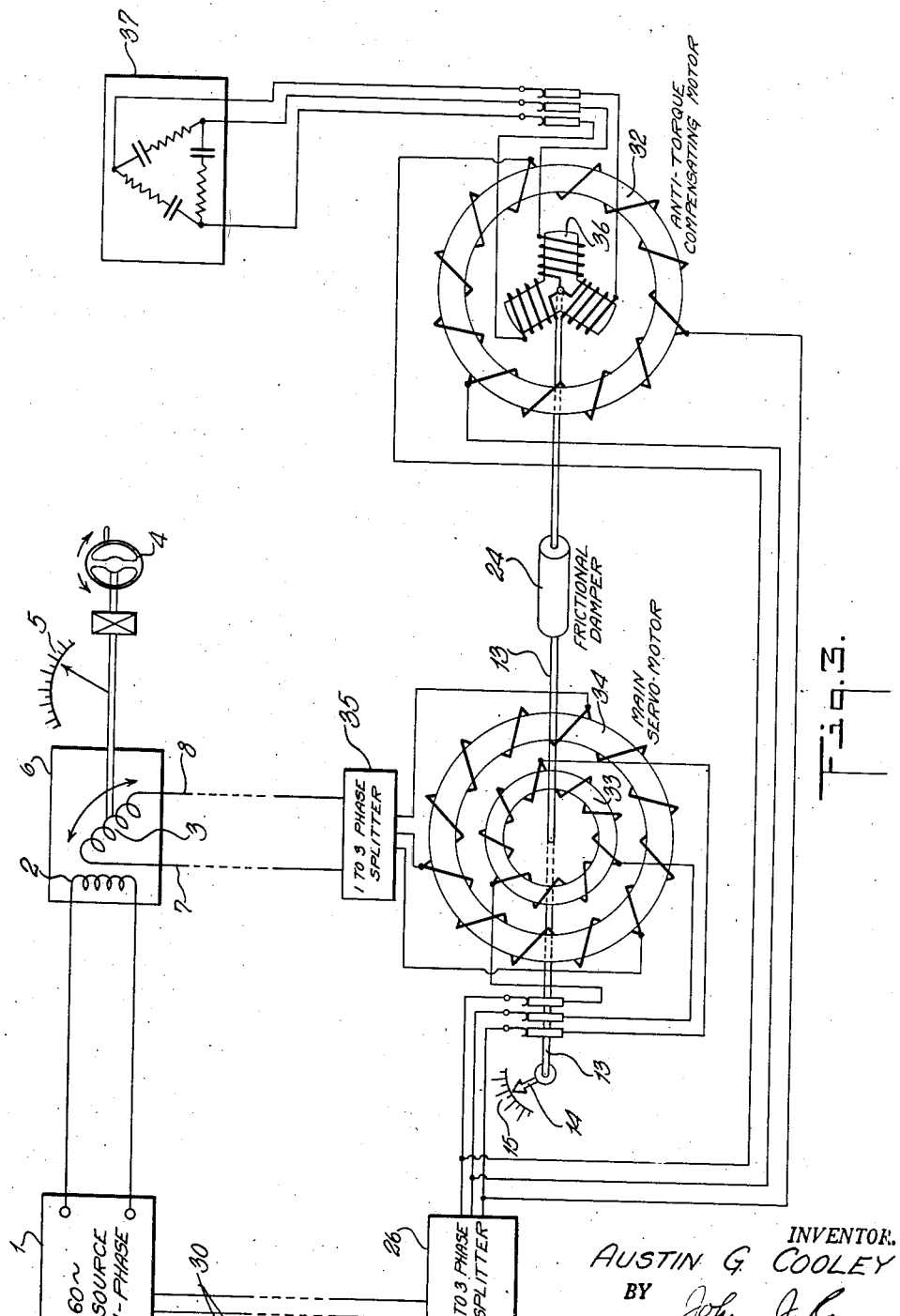

2,499,132

UNITED STATES PATENT OFFICE 2,499,132

REMOTE SELF-SYNCHRONOUS CONTROL SYSTEM

Austin G. Cooley, New York, N. Y., assignor to Times Facsimile Corporation, New York, N. Y., a corporation of New York Application December 17, 1947, Serial No. 792,313

8 Claims. (Cl. 318—24)

This invention relates to remote control systems and more particularly it relates to servomotor arrangements for use in such systems.

A principal object of the invention is to provide a remote control system of the type employing a source of single phase control signals whose phase is varied for the remote positioning of a distant shaft. The distant shaft is driven by a main alternating current motor having a rotor and stator at least one of which is adapted to be energized by a polyphase alternating current, in conjunction with a compensating or torque balancing motor connected to the first motor for preventing the first motor from tending to creep or continuously rotate in synchronism with the polyphase alternating current. As a result, the main motor turns only when the phase of the said control signals is changed and to an extent determined by the amount of such phase change.

Another object of the invention is to provide an improved servo-motor system, wherein the servo-motor has its stator continuously excited from a polyphase alternating current supply source and its rotor excited under control of a signal-controlled single phase source, or vice versa, that is with the rotor excited by a polyphase alternating current and the stator excited from a single phase source.

Another object of the invention is to provide an improved arrangement for controlling a servo-motor from a remote signal-controlled single phase alternating current source, the servo-motor being energized from a polyphase alternating current source; together with means for preventing tendency of the rotor to rotate when the phase of the control signal remains unchanged.

Another object is to provide a main servo-motor which is excited locally by polyphase alternating current the rotor or stator excitation being controlled by a remote single phase alternating current source; in conjunction with another or auxiliary servo-motor which inhibits rotation of the rotor of the main servo-motor when the single phase signal is not being changed in phase, or if the rotor of the main motor is open-circuited.

A feature of the invention relates to a main servo-motor which is arranged to have its stator excited from a three-phase alternating current source, and its rotor excited from a single phase source the instantaneous phase of which can be varied in accordance with signals; in conjunction with a similar auxiliary servo-motor which also has its stator excited from said three-phase source but with its rotor connected to an artificial line or electric network which simulates the impedance of the signal-controlled phase shifting device associated with the main motor.

Another feature relates to a remote control system having a pair of alternating current motors each with a three-phase stator and a single phase rotor. One of the single phase rotors is arranged to be excited by an adjustable single phase alternating current, and the stators are connected for excitation from the same three-phase alternating current supply source. The rotors of the two motors are mechanically connected to a common shaft to be controlled while the stators are excited from the same three-phase source in such a way that one motor tends to oppose rotation of the other motor while the phase of said single phase current remains constant.

A further feature relates to a servo-motor system employing a polyphase servo-generator and a polyphase servo-motor controlled thereby, together with means for preventing rotation of the rotor of the servo-motor except when variable phase signals are received from a remote control point.

A still further feature relates to the novel organization, arrangement and relative interconnection of parts which cooperate to provide an improved remote control system of the servo-motor type.

Fig. 1 of the drawing shows in composite block diagram form and schematic wiring form, a typical remote control system embodying features of the invention.

Fig. 2 is a modification of Fig. 1.

Fig. 3 is another modification of Fig. 1.

The ordinary servo-motor system employing a synchro-generator and a synchro-motor are connected so that the rotors of both motors are excited by a single phase alternating current, and the stators are either delta or Y connected to provide a three-phase interconnecting circuit between the generator and motor. The rotor of the synchro-generator is arranged to be turned through any desired angle representing a signal, and the rotor of the synchro-motor electrically follows the rotation of the generator rotor. In other types of follow-up systems, for example in the so-called "Selsyn," the stator of the synchro-generator is supplied from a two-phase alternating current source, however, the two-phase power is split into three windings of a typical three-phase arrangement, either delta or Y. With such an arrangement, if one of the stator windings receives power at zero phase, the other two windings receive power 180° displaced from the first winding but the power in the second or third winding is less than that of the first winding, while the resultant power in the second and third winding is equal to that of the first winding. If with such a conventional construction of servo-generator or servo-motor, attempts are made to excite the stator with balanced three-phase current, the rotor will start turning as if it were the rotor of an induction motor of the squirrel-cage type. For this reason, it has not been practicable heretofore to excite the stators of synchro-generators or synchro-motors from a three-phase alternating current source. It is necessary in certain types of remote control signalling systems to provide a servo-motor which has no tendency to rotate in either direction unless a phase shifted signal is applied to the rotor; and yet it is necessary to provide accurate rotational control of the rotor in response to the phase variations of the applied signal. A typical arrangement, according to the invention, for accomplishing these results is shown in the drawing.

Referring to the drawing, the block 1 represents any suitable source of 60-cycle single phase alternating current supply, whose frequency and phase are held within rather close limits. Source 1 is connected to the stationary element 2 of any well-known form of electrical phase shifter network whose adjustable element 3 is mechanically connected to an adjusting wheel or handle 4 associated with a phase or angle calibrated scale 5. The output of the phase changer 6 is therefore a single phase 60-cycle alternating current signal whose phase can be adjusted by means of the member 4. It will be understood of course that the member 4, instead of being operated locally, can be operated remotely in response to signals representing any selected phase or angular position of member 4.

The output of device 6 is applied over the conductors 7, 8, to the single phase winding 9 of a rotor 10. Associated with rotor 10 is a stator 11, having its windings connected for three-phase excitation, either delta or Y, from the three-phase 60-cycle power source 12. Preferably, source 12 is connected to source 1 via a transmission line and provided with well-known arrangements for maintaining the frequency of sources 1 and 12 constant. Rotor 10 and stator 11 can be of any well-known construction such as customarily employed in synchro-generator or synchro-motor devices. For a detailed description of such synchros, reference may be had to chapter XII, article 1, pages 12–3 and 12–4 of "Principles of Radar," published by McGraw Hill Book Company, Inc., New York, New York.

The shaft 13 carrying rotor 10 is connected to a pointer 14, which is associated with a phase or angle calibrated scale 15. With such an arrangement, if the circuit to winding 9 is open or if the phase remains constant, there is a tendency for the rotor 10 to rotate as if it were the rotor of an induction motor of the squirrel-cage type. In order to overcome this tendency to rotate, the shaft 13 is connected to the rotor 16 of a similar synchro-motor whose rotor winding 17 is connected by conductors 18, 19, to an electrical load in the form of an artificial line 20, comprising for example the resistance 21 and the reactance 22. The reactance 22 may take the form of an inductance, a capacitance, or a combination of resistance, inductance and capacitance, as is well-known in the artificial line art. This artificial line has its elements so proportioned as to have the same impedance as the impedance facing the winding 10 from the device 6. The stator winding 23 of this auxiliary servo-motor is likewise the same as the winding 11 of the main servo-motor, and it is connected in a three-phase arrangement to the source 12. However, two of the leads from the source 12 are reversed as compared with their connection to stator 11 so as to insure that the torque of rotor 16 is opposed to that of rotor 10. Thus, if the circuits to both rotors 10 and 16 are open, and if the stators of both motors are energized from the source 12, the system is well-balanced and there is no tendency to spin or take off so that the shaft 13 remains stationary. However, if the rotor winding 9 is supplied with single phase power through the device 6, and if the rotor winding 17 were disconnected from the device 20, the rotor 10 would then tend to continuously rotate by squirrel-cage induction motor action even though the member 4 is held stationary. On the other hand, when the winding 17 is connected in circuit with the artificial line 20 and the winding 9 is connected to the device 6, the above-mentioned torque tending to rotate shaft 13 by means of rotor 10, is counter-balanced by an equal and opposite torque from rotor 16. Consequently, if the member 4 is rotated to represent a phase angle signal, the pointer 14 will respond very accurately to variations in position of the said member 4. While the drawing shows a frictional or mechanical damper 24 which couples the two rotors 10 and 16 together, it has been found that this mechanical damper is not entirely necessary, its function being primarily to act as a cushion between the two sections of the shaft 13 while enabling rotary torque to be positively transmitted from one section of the shaft to the other. In that case the rotors 10 and 16 can be mounted on the same shaft which carries the pointer 14. Preferably, the elements 21 and 22 of the artificial line 20 are adjustable so as to match the impedance of the line 17—18 to the input impedance of the winding 9. For a detailed description of the manner of matching the said impedances, reference may be had to Radio Engineers Handbook by F. E. Terman, first edition, published by McGraw Hill Book Company, Inc., New York and London, 1943, pages 206–208 and 210–215.

While in the foregoing description, the motors are shown with a single phase rotor and a polyphase stator, these motors may be of a type having a polyphase stator and a single phase rotor. Thus, as shown in Fig. 2, wherein the parts which are identical with those of Fig. 1 bear the same designation numerals, the single phase 60-cycle signal which is sent over line 7, 8, is connected to the single phase stator winding 25, while the three-phase current from the device 26 is supplied to the three-phase windings on the rotor 27. Likewise, this three-phase current is applied to the three-phase windings of the rotor 28 of the compensating motor, and the single phase stator winding 29 of this compensating motor is connected to the artificial line 20 for purposes above described. In Fig. 2, the device 26 instead of being a separate three-phase 60-cycle source which is maintained at the same frequency as the source 1, may consist of any well-known phase splitter for receiving the single phase 60-cycle current from source 1 over the transmission line 30 and converting it into a three-phase signal of the same 60-cycle frequency.

While in the foregoing the motors have been described as having a three-phase stator winding (Fig. 1) or a three-phase rotor winding (Fig. 2), it will be understood that the stators of Fig. 1 and the rotors of Fig. 2 can be other polyphase windings, for example two-phase windings, supplied with the appropriate polyphase alternating current, for example by a two-phase 60-cycle current. It is understood that in all cases the various phases of the polyphase current are supplied to the polyphase windings of the auxiliary motor so as to produce under the conditions hereinbefore described, a torque which is opposite to that produced in the main motor which is controlled over line 7—8.

If desired, the auxiliary or compensating motor can have a polyphase rotor 31 and a polyphase stator 32 with the stator windings connected to the polyphase source 12 or 26 and with its polyphase rotor connected to an artificial line. Such an arrangement is shown in Fig. 3, wherein the parts which are identical with those of Figs. 1 and 2, bear the same designation numerals. In this embodiment, the main motor has a three-phase rotor 33 and a three-phase stator 34. The adjustable phase single phase signals from the device 6 transmitted over the lines 7—8, are applied to a 1-to-3-phase splitter 35, for dividing the single phase control signals into corresponding balanced three-phase control signals which are applied to the stator 34 of the main servo-motor. Likewise, the single phase 60-cycle signals from the source 1 are applied to a 1-to-3-phase splitter 26 and thence to the rotor 33 of the main motor. The auxiliary or compensating motor has a three-phase rotor 36 which is coupled to the shaft 13 and this rotor has its windings connected to a balanced three-phase artificial line 37 which is proportioned so as to reflect an impedance into the windings of rotor 36 which impedance is equal to the input impedance of the windings of stator 34.

Various changes and modifications may be made in disclosed embodiments without departing from the spirit and scope of the invention.

What is claimed is:

1. Apparatus of the type described, comprising a master shaft, a slave shaft, an alternating current motor which is to be remotely controlled from said master shaft to position said slave shaft, said motor having a single phase rotor and a three-phase stator, a similar auxiliary motor having a single phase rotor and a three-phase stator, means connecting the stator windings of both motors to the same source of three-phase alternating current supply, means connecting the rotor winding of the first motor to a source of adjustable single phase alternating current, and means connecting the rotor of the auxiliary motor to an electrical load network whose impedance is matched with the input impedance to the rotor of the first-mentioned motor.

2. Apparatus according to claim 1 in which the phase excitation of the stator of said auxiliary motor is related to the phase excitation of the stator of the first motor to apply equal and opposite torque to said slave shaft when the phase of the single phase alternating current remains unchanged.

3. Apparatus according to claim 1 in which the rotor of the first-mentioned motor is coupled to the rotor of the auxiliary motor through a mechanical damping device.

4. Apparatus of the type described, comprising a source of alternating current signals of adjustable phase, a remotely located servo-motor whose rotor is connected to said source and whose stator is connected to a source of polyphase alternating current so that normally said motor tends to rotate even when the phase of said alternating current signals remains constant, and a stabilizing motor having its rotor coupled to the rotor of said servo-motor and excited from said polyphase source to oppose the said tendency to said servo-motor to rotate except when the phase of the signals from said source is being adjusted.

5. Apparatus according to claim 4 in which the said stabilizing motor comprises a polyphase stator which is excited from said polyphase source, and a single phase stator which is connected to an electrical load whose impedance matches the input impedance to the rotor of said servo-motor.

6. Apparatus of the type described, comprising a source of single-phase alternating current, a signal-controlled phase shifter having its input supplied from said source, means to derive a polyphase alternating current from said source, a main alternating current motor to be remotely controlled, said motor having a single phase stator winding and a polyphase rotor winding, means connecting said rotor winding for continuous excitation with polyphase alternating current, means connecting said stator winding with the output of said phase adjuster, and an auxiliary alternating current motor having its rotor mechanically coupled to the rotor of the first motor, the stator of the auxiliary motor being connected for excitation by said polyphase source, and the rotor of said auxiliary motor having a winding connected to an adjustable electrical load network.

7. Apparatus according to claim 6 in which said auxiliary motor has a polyphase rotor which is supplied with said polyphase alternating current, said auxiliary motor having a single phase stator which is connected to an artificial line for the purpose described, the connection of the phases of said auxiliary motor being such as to cause said auxiliary motor to have an opposite torque to that of said main motor when the phase of the single phase current applied to the stator of the main motor remains unchanged.

8. Apparatus of the type described, comprising a source of single-phase alternating current, a signal-controlled phase shifter having its input supplied from said source, a source of polyphase alternating current synchronized in frequency with the frequency of said single-phase source, a main alternating current motor having stator and rotor windings one of said windings being a single-phase winding and the other being a polyphase winding, means connecting the output of said phase shifter to the single-phase winding of said motor, means connecting the polyphase winding of said motor to said polyphase source, an auxiliary alternating-current motor having a stator winding and a rotor winding one of said windings of the auxiliary motor being a single-phase winding and the other being a polyphase winding, means mechanically interconnecting the rotors of both motors together, means connecting the polyphase winding of the auxiliary motor to said polyphase source, and means connecting the single-phase winding of the auxiliary motor to an adjustable impedance-matching electrical network for the purpose described.

AUSTIN G. COOLEY.

REFERENCES CITED

The following references are of record in the file of this patent:

UNITED STATES PATENTS

| Number | Name | Date |
|---|---|---|
| 633,690 | Franke | Sept. 26, 1899 |

FOREIGN PATENTS

| Number | Country | Date |
|---|---|---|
| 487,457 | Great Britain | June 14, 1938 |

OTHER REFERENCES

General Electric Review, vol. 39, No. 6. June 1936, pp. 274–279.